United States Patent

[11] 3,609,114

[72] Inventor Elvin M. Bright, Sr.
15940 Valley Vista Blvd., Encino, Calif. 91316
[21] Appl. No. 686,170
[22] Filed Nov. 28, 1967
[45] Patented Sept. 28, 1971

[54] MOLDABLE INTERPOLYMERS, CAST PRODUCTS THEREOF AND APPARATUS FOR THE PROCESSING THEREOF
10 Claims, 5 Drawing Figs.
[52] U.S. Cl. .................................. 260/30.4 EP, 260/37 EP, 260/41 A
[51] Int. Cl. ........................................ C08g 51/26
[50] Field of Search ........................... 260/37, 837, 30.4 EP; 161/41

[56] References Cited
UNITED STATES PATENTS
2,824,851 2/1958 Hall .............................. 260/837
2,848,433 8/1958 Eirich .......................... 260/837
3,247,288 4/1966 Masters et al ................ 260/837

*Primary Examiner*—Morris Liebman
*Assistant Examiner*—L. T. Jacobs
*Attorney*—Sellers and Brace ABSTRACT: A transparent and/or internally colorable, thermosetting, molded article curable at room temperature and having the capability to embed up to 90 percent of high density particles suspended by micronized silica or, alternately, contain internally visible objects, providing an article of manufacture including both structural and art objects. Typically, the article is polymerized from a clear fluid mixture of bisphenol-A-type epoxy resin and alkyl acrylate monomer dissolved in glycidyl esters of low viscosity, plus a viscosity-lowering catalyst such as N-aminoethyl piperazine; the resulting interpolymer is characterized by workability of 150 percent to 300 percent elongation without stress when 75 percent polymerized. The polymer characteristically does not recede from mold face in casting and hence may be formed with fine engravinglike surface configurations. Wafer-thin castings of flexible, incompletely cured polymer may be permanently bonded to rigid surfaces by coating with silicone resin adhesive and silicone polymerization catalyst. Also provided are unique apparatus and a process for molding wafers, plaques and the like of the invention composition and for laminating the same permanently to another body while completing polymerization of the composition in intimate contact with an adhesive also undergoing polymerization.

PATENTED SEP 28 1971
3,609,114
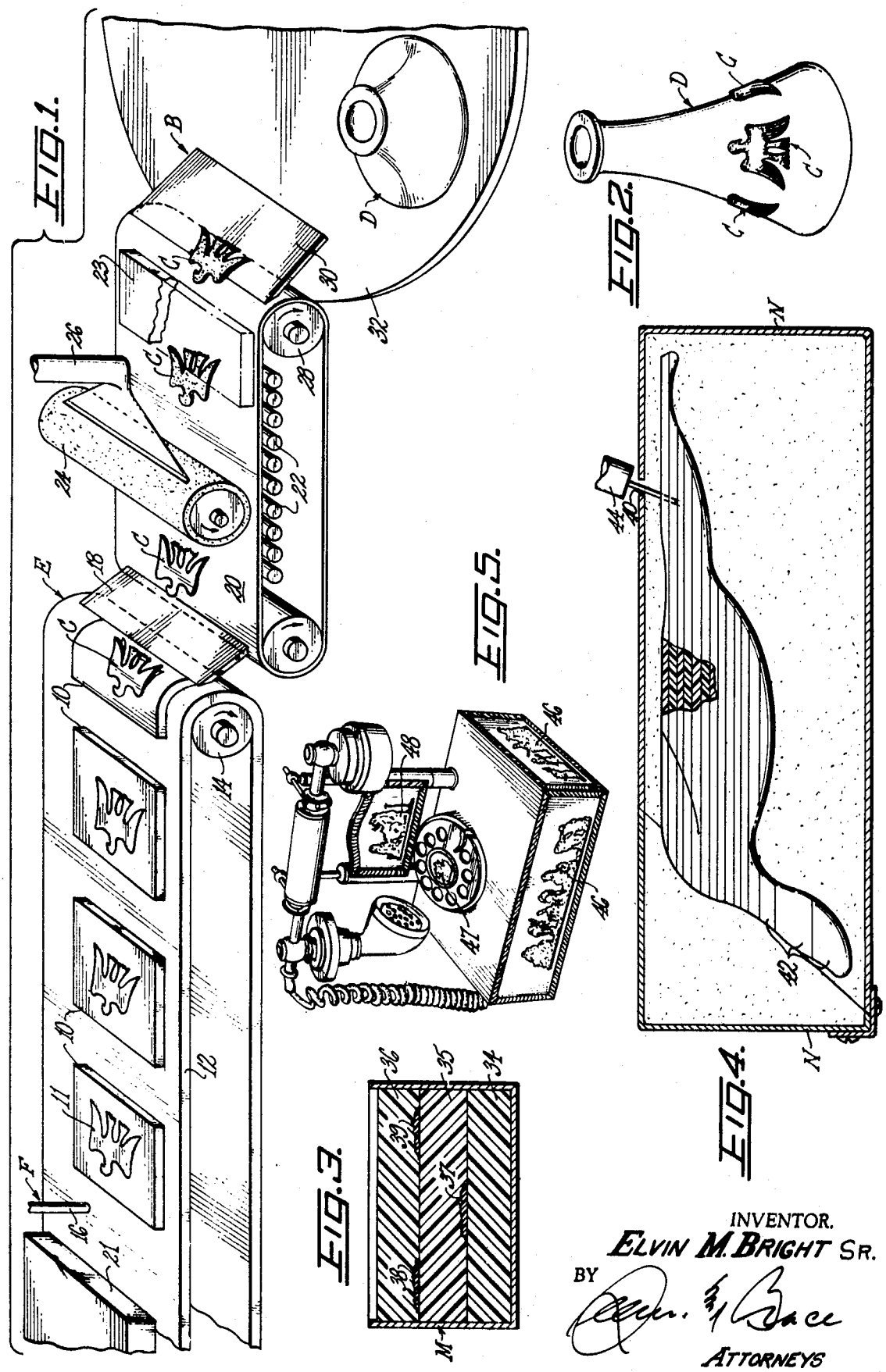
INVENTOR.
ELVIN M. BRIGHT SR.
BY
ATTORNEYS

MOLDABLE INTERPOLYMERS, CAST PRODUCTS THEREOF AND APPARATUS FOR THE PROCESSING THEREOF

Epoxy resins have been used for some years as thermosetting polymers which cure to form such useful products as electrical insulating coatings, laminates, adhesives, sturdy structural elements, etc. Two general types are (1) the glycidyl ether reaction product of an epihalohydrin with a polyhydric alcohol or phenol such as bisphenol-A; and (2) the reaction product of olefins with peracetic acid. The present invention employs polymers of the first type, which are characterized by the glycidyl ethers having terminal epoxy groups which are one carbon atom removed from the ether linkage, their polymerization generally being effected under the influence of a catalyst at elevated temperature.

Various diverse monomers have been copolymerized with epoxy material in the past, thereby usually producing products of "intermediate" physical properties which were not necessarily desirable. Composite acrylic-epoxy resins are described for example in U.S. Pat. No. 2,824,851. In retrospect, it has become apparent to those skilled in this art that a desired physical property which may occasionally be contributed to the product by introduction of a different monomer, is more likely to be accompanied by the loss of other desirable characteristics of the dominant polymer which is being "modified." Thus, for example, it would be advantageous to combine such properties of epoxy resins as their structural strength, surface hardness and their singularly unique characteristic of net receding from the wall of a mold during curing, with such properties of acrylate resins as their transparency and high luster. The shrinkage characteristic of epoxy is particularly important and useful since shrinkage associated with polymerization and cure of this material occurs strictly in that portion of the liquid charge having an exposed surface out of contact with the mold. In consequence, the shrinkage which does occur can be restricted to the mold-filling sprue.

Accordingly, it is an object of the present invention to provide an essentially custom-tailored thermosetting resin, curable at room temperature if desired, and which combines desirable physical properties of both epoxy and acrylate resins to produce a structurally strong, moldable, transparent, surface-hardened interpolymer having a pronounced capability of being molded to high precision without shrinkage in the main body of the molding.

Another object of the invention is the provision of a new transparent thermosetting resin capable of being molded to a desired configuration along with coloring dyes, mineral particles, aggregates artifacts dispersed uniformly, nonuniformly or in any desired manner or pattern to serve esthetic or structural purposes and to provide objects dart of a unique nature, or simulating formations and minerals occurring in nature.

Another object of the invention is the provision of an improved moldable plastic resin adapted for use in making precision dentures.

One development of the prior art has been an epoxy tripolymer which is free of volatile solvent and therefor more useful in the potting and casting fields such as that proposed in the U.S. Pat. No. 3,247,288. This composition is based in part on a liquid epoxy composition boiling at 150° C. or higher, which serves as solvent for two other liquid polymerizing monomers which, by catalytic action, react at a temperature lower than the boiling temperature of the "reactive solvent," which latter also solubilizes the forming copolymer. The copolymer-solvent composition is then heated in a mold above solvent-boiling temperature to form and cure a resulting three-component polymer. However, as will be recognized from the disclosure of the aforementioned patent, the amount of epoxy component thus incorporated in the tripolymer is no greater than about 40 percent and its contribution of properties to the final product would be expected to bear a like ratio. In contrast the present invention incorporates epoxy component on the order of 80 percent into a particular three-component polymer, which by judicious selection of its components, possesses correspondingly advantageous final properties and also extraordinary workability when incompletely polymerized.

Thus, another purpose of the invention is to provide such a moldable polymeric composition which at a still-plastic stage of incomplete cure, e.g. approximately consummated 75 percent cured, exhibits an elongation potential of several hundred percent and which in such condition can be readily worked into final form without inducing stress in the shaped material. Such partially cured plastic composition may have a Rockwell M hardness on the order of 40, as contrasted with a cured hardness of 90. A freshly compounded ⅛-inch thick casting may arrive at such a cohesive but workable state in about 20 minutes at 150° F., or in about 24 hours at ambient room temperature when using about 20 percent weight catalyst. Further, such a cohesive plastic may then be kept in a state of incomplete or suspended cure for up to about 3 days at room temperature, or indefinitely simply by lowering the temperature to about 10° F. and this is true irrespective of whether the material is shaped or unshaped. After first shaping and storing in a cold area, the natural cure may later by consummated simply by raising the temperature of such article.

Another object of the invention is the provision of cast flexible wafers of incompletely polymerized material which may then be attached conformingly to a curved or planar surface and there cured to form an infusible and irremovable portion in bas-relief. Thus such a flexible cast wafer "sculpturally" configured on one face and planar on the other can be bonded in conforming juxtaposition to a ceramic or other supporting surface by heating the wafer to an appropriate temperature as up to about 250° F., and coating the planar side with a mixture of silicone resin adhesive and silicone polymerization catalyst such as gamma aminopropyl triethoxysilane. The invention also provides apparatus for producing such incompletely cured, flexible, adhesive-coated wafers in a continuous process ready for bonding to an selected supporting surface or article.

Still another purpose of this invention is the provision of a novel technique for utilizing the invention composition to cast one-piece multilayered articles, including structural panels, the layers of which are of different colors, patterns and compositions. When relatively small in size, such composite castings can be placed in suitable mountings to form rings, brooches, tie-clips, pendants and other articles of jewelry, or as inserts for larger objects such as steering-wheel centers, telephone dials, knife or gun handles, etc. Larger structural panels thus formed with cameolike or bas-relief patterns are suitable for use in an endless variety of decorative applications in the home, in the industrial arts, and personal adornment. Portions or all of such decorative articles may also be metal-coated as well as combined with other articles and other materials.

Another object of the invention is the provision of multilayered castings from successive charges of the uncured fluid material, each formulated in a different density and color.

Other objects and advantages will become apparent as the description proceeds.

In brief, by maintaining a major portion of about 75 percent to about 85 percent weight of glycidyl-ether-type epoxy resin it is found that the singular volmetric contraction or mold-adhering property of epoxy resin is imparted to the entire mass. It has also been found that this epoxy resin can be formed into a tripolymer having the aforementioned properties while exhibiting the transparency and refractive properties of acrylate and methacrylate resins, by the selection of a nearly water-white, high-boiling liquid glycidyl ester of low viscosity and which is both a solvent for the epoxy prepolymer and also will mix freely with a selected acrylic monomer without clouding. Further, by using catalyst for epoxy-polymerization which is miscible with colorant material and which also further lowers the viscosity of the fluid mix, the catalyst and coloring agent can be initially and uniformly dispersed through the transparent mass before polymerization, thereby imparting the desired hue to the final product. Also mineral-colorant in fine particulate form can be dispersed or suspended in the initial mixture by the aid of micronized silica to form up to about 90 percent weight of the whole, so as to be cast into the body of congealing interpolymer and simulate a body of any of a large number of natural stones including jade, onyx, marble and many others.

Alternately, artifacts such as statuettes or even natural pieces of rock or the like, can be embedded in protective transparent castings of the resin composition. Also, in a still-fluid coating, by use of a hypodermic needle or syringe, portions of the same interpolymer composition having a different color and/or density than the body of casting, can be introduced at selected levels of the fluid body and there persist without coalescing with the body until the whole is cured into an integral block with the distinct "inserts" remaining clearly discernable in a transparent body.

Commercially available liquid epoxy resins or prepolymers may be used. For example, "Epon Reson 826" sold by Shell Chemical Co. is a diglycidyl ether, bisphenol-A-type liquid epoxy resin or prepolymer. It has an epoxide equivalent of 180–188, viscosity 65–95, maximum color 2 (Gardner), density 1.164 g./ml., hydroxyl content 0.025 eq. OH/100 g. resin, and is supplied without diluents.

A suitable "reaction solvent" or diluent for the epoxy resin is "Cardura E" sold by Shell Chemical Co. This is a mixture of high-boiling, low-viscosity, liquid glycidyl esters of tri-alkyl carboxylic acids, forming a water-white fluid. The mixture has the general formula

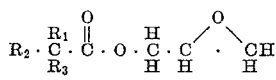

wherein $R_1$, $R_2$, $R_3$, are alkyl radicals totaling $C_{7-9}$, or a molecular formula of $C_{12114}H_{22126}O_3$; boiling point 275° C.; density 0.972 g./ml., viscosity 7–8 c.p.s. solubility in water 0.03 percent weight 20° C.

Many acrylate and methacrylate monomers have been tested and found unsuitable to produce interpolymers having the present advantageous properties. For example, methacrylates as a class do not form a satisfactory interpolymer but only a cheesy gel which tends to rupture upon shaping. Suitable reactive monomers are normally liquid, colorless alkyl acrylates characterized by alkyl radicals having about 6 to about 10 carbon atoms and which are miscible without clouding in the epoxy-glycidyl ester mix. An outstanding example is 2-ethylhexylacrylate. Hexylacrylate as well as corresponding branched alkylacrylates are less satisfactory but often useable, sometimes in admixture. The final solubility with the other (total) components of the mix should be tested in each case.

Any of the class of known epoxy polymerization catalysts, particularly the trialkylamines, will promote the present interpolymerization of curing of the composition; however, many are unsatisfactory for other reasons, because of increasing the viscosity of the fluid mix, and/or imparting cloudiness or discoloration to it, etc. An outstandingly effective catalyst is N-aminoethyl piperazine (AEP) which is employed on the order of about 15 percent weight to about 22 percent weight since it is freely miscible without discoloring the mix, and also acts as a dispersant for added colorants of the known group of colorants for epoxy resins which may be incorporated at the same time. In addition, this preferred catalyst desirably further decreases the viscosity of the polymeric mixture on the order of 10 percent to 30 percent.

A particularly advantageous characteristic of the present polymeric composition is its pronounced workability when in a pliable cohesive state of incomplete polymerization designated somewhat arbitrarily as being about 75 percent polymerized. This corresponds to a Barcol hardness of about 30 as contrasted with a Barcol hardness of about 40 to 45 and a Rockwell M of about 95 at complete cure. The mixture arrives at this state in about 8 hours at ambient room temperature or in about 2 hours at 150° F.; or in about 20 minutes at 250° F. When using about 18 percent weight catalyst, after casting or other shaping operation a complete cure is achieved in a additional 72 hours at ambient room temperature; or in about 6 to 8 hours at 150° F.; or in about 10 minutes at 250° F. At this 75 percent polymerization, the cohesive material can be readily shaped or molded and is capable of 150 percent to 300 percent elongation without inducing stress. It is particularly adapted to casting centrifugally. The cured product has an impact strength approximately three times that of typical epoxy resin, or 1.5 ft. lb. per inch notch; a tensile strength of 10,000 p.s.i.; and a flexural strength of 12,000 to 16,000 pounds.

The invention may be further illustrated by reference to the accompanying drawings wherein:

FIG. 1 is a semischematic perspective view of apparatus for continuously casting, ejecting and adhesively coating incompletely cured, flexible, decorative wafers of the invention polymeric material ready for bonding to a suitable supporting surface;

FIG. 2 is a perspective view of a ceramic vase with several of the decorative wafers of FIG. 1 permanently bonded thereto;

FIG. 3 is a vertical section taken through a composite casting of three layers of different colors or transparency including inlays of the same material located at different levels therein before the whole is cured;

FIG. 4 is a longitudinal vertical sectional view taken through a multilayered art object formed of successive layers of different density material stratefying from a poured mix and cured to a solid integral article; and FIG. 5 is a perspective view of a telephone handset and cradle, the latter being constructed in part of cast decorative panels of the present material.

As is particularly illustrated in FIG. 1, there is provided a sequence of open-top molds 10 of suitable flexible material such as silicone rubber secured to an endless conveyor 12 which is movable in a timed sequence by suitable drive means 14. The empty molds 10 are initially heated to about 150° F. by infrared heaters 21. Measured amounts of the present flowable plastic material are metered into each preheated mold cavity 11 through a supply nozzle 16 at loading station F, the upper surface of the plastic assuming a planar configuration. The rate of conveyor travel is correlated with the approximately 75 percent polymerized or "cohesive-pliable" setting time of the plastic material so that, as each mold 10 arrives at the ejection station E, the relatively thin wafer or casting C has congealed but is easily flexed to conform with a curved surface; otherwise it retains its molded configuration.

Accordingly, as the flexible mold 10, with its underface held against the terminally arcing belt 12, is bent in passing over drive roller 14, the congealed casting C is progressively released from the mold and its free, leading edge moves over an angularly disposed slide plate 18 onto another conveyor 20. The latter closely overlays a bank of heating elements 22 of any suitable character well known in this art, to warm the ejected wafer to a "rapid cure" temperature as, for example, about 250° F. At the same time, a roller coater 24 applies a covering of silicone resin adhesive (General Electric Co., SR529 from which volatile solvent has been removed) containing about 5 percent weight silicone polymerization catalyst (gamma aminopropyltriethoxysilane) to the exposed, flat, back face of wafter C. Such coating material, supplied from a reservoir 26, is equally suitable for permanently bonding the wafer to diverse rigid surfaces or objects including ceramic, metal, wood, plastic, etc.

Prior to reaching drive roller 28, the coated wafer is further heated by infrared heating units 23 before passing down a second slide plate 30 to an attachment or bonding station B. There, successive heated and coated wafers C are pressed conformingly against the side of articles, such as unheated ceramic articles supplied by a rotary table 32. The assemblies are then allowed to cure by standing for about 24 hours, thereby producing the finished article such as shown in FIG. 2.

The resulting assembly is inseparable into its original components and is thoroughly permanent in every respect.

FIG. 3 and 4 illustrate multilayered castings formed of the present material. FIG. 3 shows a deeper, open-top, flexible mold M with successive layers 34, 35, 36 of the present composition and differing only in the presence of different amounts of added finely ground mineral colorant or other dye, the background layer 34 being more heavily colored to render it opaque, the intermediate layer 35 being tinted but still transparent, and the outer layer 36 being clear and without colorant. Smaller "inserts" 37, 38, 39 of the same polymeric material are placed or injected as by the aforementioned hypodermic needle technique at selected levels, not necessarily atop a layer. In particular, the injected insert of polymeric material may be shaped to any desired configuration giving it vertical dimension within the fluid block, by use of such a needle point, thereby producing a true one-piece, integral three-dimensional object when cured. It is thus possible to "paint" or mold three-dimensionally, within—that is, beneath the surface—of the block of subsequently solidified plastic.

FIG. 4 shows a two-piece mold N having a pour opening 40 through which successive layers 42 of liquid material incorporating differing concentrations of mineral particles of differing densities are introduced as by a syringe or pipette 44. It has been found that if mineral additives having densities, differing by a minimum of about 5 percent, such as those mentioned in Examples 2 to 4 below, are initially uniformly dispersed in the present polymerizable composition, and the mixture then allowed to stand after charging into the mold, the additives stratify into several levels in the order of their respective specific gravities. Thus a mixture of four mineral additives such as aluminum silicate, calcium carbonate, copper carbonate, barium sulfate readily separate into four layers before gelling. If desired, another quantity of mix can then be added to the mold to form additional layers. Each separating layer will have a thickness proportional to the quantity of mineral present. Since the different additives each impart a different color to the final cured product, the latter will be formed with layers or strata of different colors. By using minerals having densities differing by less than about 5 percent, the mold-separated layers can be controllably blended or merged into one another, thereby producing pleasing esthetic effects of a wide variety. By this technique the artisan is enable to provide art objects and to duplicate and simulate substantially any mineral coloration found in natural minerals.

FIG. 5 shows a telephone handset and cradle wherein the four upright box panels 46 with cameolike figures and filigree border are each cast of the present material, as well as the center dial insert 47 and the panel 48 which spans the handset-supporting posts.

The invention may be further illustrated by the following detailed examples:

EXAMPLE 1

The following composition was blended with an electric mixer:

76 g. "Epon Resin 826"-Shell
12 g. "Cardura E"-Shell
12 g. 2 -ethylhexyl acrylate-union Carbide 18 g. N-aminoethyl piperazine
(Optional) 100 p.p.m. low viscosity, dimethyl poly-siloxane antifoaming agent-General Electric AF66

This composition has a specific gravity of about 1.17 and a viscosity of about 10 to about 20 c.p.s. cps. before addition of catalyst. When cast into ⅝-inch wafers of FIG. 2, it achieved a 75 percent cure in about 20 minutes at 150° F., or in about 24 hours at ambient room temperature. When processed by the apparatus of FIG. 1, this 20 minutes is the travel time of conveyor 12 from filling station F to ejection station E. A minimum practical thickness of such wafers is about 0.05 to about 0.10 inch.

EXAMPLE 2

The composition of Example 1 was mixed with an equal weight of clear 150–200 mesh, commercially available, leaded glass of 63.5 percent weight lead content and 33.5 percent weight glass content; 1.5 percent weight 325 mesh aluminum silicate crystals; and 1.5 percent weight micronized silica-Cabot Corp. "Cab-O-Sil" (a fire-dry pyrogenic silica with a particle size of about 0.015 micron and surface area of 200 m.²/gm.). This composition was cast and cured into articles having a density and coloration simulating jade. If only the jade color (without the jade density) is desired, only the aluminum silicate need be used. Or the aluminum silicate can be omitted and jade-colored glass be used instead, either leaded or unleaded.

EXAMPLE 3

To the composition of Example 1 was added 0.5 g. or about 0.25 percent weight to about 4 percent weight of calcium carbonate crystals to impart a marblelike appearance to the final product. This mixture was employed to cast the telephone cradle panels shown in FIG. 4. If desired, the cured panels can be vacuum-coated with gold, silver or bronze. If a casting has substantial metallic content, as in Example 2, it can be metal-plated, employing conventional plating technique. About 325 mesh calcium carbonate is used for white tinted, milkglasslike castings, or for forming a vehicle for rose quartz. Otherwise, 150 to 200 mesh is used. Although the calcium carbonate imparts a white appearance to the initially colorless plastic, it can be considered as colorant material.

EXAMPLE 4

Intimately mix various metallic salts or mineral particles with the composition of Example 1 to obtain a casting of a desired color and/or density. Depending on the color intensity desired, from about 2 percent weight to about 70 percent weight of insoluble mineral salts are employed, such as aluminum silicate or calcium carbonate. Other useful salts include copper carbonate which yields a casting which simulates malachite. Barium sulfate simulates feldspar. Iron pyrites can be incorporated to produce a gold-appearing casting, or gold particles can be incorporated. Up to as much as 90 percent of the final casting may consist of mineral particles, initially suspended or dispersed by about 1.5 percent weight to about 3 percent weight of micronized silica, such as that available from Cabot Corp.

EXAMPLE 5

Into separate portions of the composition of Example 1 was added respectively about 1 percent weight raw sienna and about 1 percent weight burnt umber. The two mixtures were flowed into a mold simultaneously and then cross-mixed to a limited degree with a spatula. The mixture cured to a hard substance having the surface appearance of wood, and the mold configuration produced the appearance of a carved wooden panel. Such castings can be assembled into furniture, doors and other structural elements.

It should be clear that when the invention is herein illustrated by way of certain mixtures of specific quantities of particular ingredients of the defined groups of interacting substances, these examples are not given by way of limitation of precise proportions but rather of embodiments of the present discovered bases of compounding which produces the final desired physical properties. A skilled chemist can apply these principles to the particular needs and ingredients at hand. These principles may be recapitulated: (1) by employing a major portion amounting to a minimum of about 75 percent weight of liquid-epoxy resin, the epoxy properties of volumetric contraction upon casting, plus its structural strength and hardness are retained in the final interpolymer. (2) By use of the herein detailed class of acrylic monomers, plus the glycidal-ester which is also a mutual solvent, interpolymerization of the whole is achieved without use of volatiles which would otherwise go off upon curing and yield a spongy product. In addition, the final product here incorporates the desired clarity of acrylate resin but now also having a hard, shock-resistant surface. (3) By choice of reactant components which produce a low viscosity of the presolidified mix, which is further lowered by the particularly exemplified epoxy catalyst AEP, an initial casting fluid is produced which, due to its low surface tension, can enter minute mold crevices and hence is useful to reproduce very fine line carvings or statuary with engravinglike detail. At the same time, separate portions of such polymerizable fluids before gelling, have the property of noncoalescing when brought together in (vertical or horizontal) surface contact, so that laterally adjacent portions of two or more such fluids can be deliberately intermingled (as with an instrument like a rake or stylus) so as to produce a mottled surface pattern which is then curable in such permanent configuration. (4) By the use of micronized silica, such casting fluid can incorporate major quantities of finely ground, clear or colored, mineral particles so as to impart selected coloring and other desired physical properties such as density, electrical conductivity, etc. Natural stone from marble to gem stones can be simulated Also, by incorporating groups of such particles having different densities per se, the fluid mix will then stratify by itself upon standing (prior to gelling) so as to give multicolored layers which then become permanent upon curing. (5) The present catalysed trio of reactive components upon initial setting, yield an uncured but cohesive composition of unusual workability which can thus be formed, even by centrifugal casting, without rupture or strain, and then solidified or cured in the imparted shape. Further, it can be kept in this workable or approximately 75 percent cured state for days at ambient room temperature, and then shaped and solidified in relatively short time by simply raising the temperature. Thus, flexible, wafer-thin castings of fine-detail configuration can be rapidly made of this material, and then by use of a mixture of silicone resin adhesive and silicone polymerization catalyst applied in a backing film, be permanently bonded to diverse supporting surfaces in conforming juxtaposition and there cured in place, even when the supporting surface is at room temperature. (6) By casting such wafers in flexible silicone rubber molds, the incompletely cured but pliant, cohesive castings can be self-ejected simply by flexing the molds; this can be effected in a continuous process by the present apparatus which then subsequently heats and surface-coats the wafers for bonding attachment.

While the particular moldable interpolymers, cast products thereof and apparatus for the processing thereof, herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A synthetic, moldable composition substantially transparent in the absence of added coloring and comprising the copolymerization product of a major portion of about 75 percent weight to about 85 percent weight of glycidyl-ether epoxy resin, copolymerized with about 8 percent weight to about 12 percent weight of liquid alkyl acrylate monomer wherein the alkyl radical has about 6 to about 10 carbon atoms and about 8 percent weight about 12 percent weight of a liquid glycidyl-ester of low viscosity which ester initially forms a solvent jointly for said epoxy resin and for said monomer before copolymerization, such solution being substantially unclouded and having a viscosity of about 10–20 c.p.s. before incorporation of a polymerization catalyst, and said copolymerization product being curable to an infusible lustrous substance of Barcol hardness of about 40 to 45 and further characterized by the properties of about 150 percent to about 300 percent elongation without stress when about 75 percent polymerized and additionally evidenced by Barcol hardness of about 30.

2. The composition defined in claim 1 characterized in that said glycidyl-ester solvent, prior to said copolymerization, is a water-white liquid having an epoxide-equivalent weight of about 240 to about 250, a molecular formula of about $C_{121}$–$H_{221}\approx_3$, a viscosity of about 7 to about 8 c.p.s. at 25° C., and boiling above about 150° C.

3. The composition defined in claim 2 characterized in that said monomer consists essentially of 2-ethylhexyl acrylate.

4. The composition defined in claim 1 intimately admixed with particles of calcium carbonate adapted to yield a cured product which simulates the appearance of marble.

5. A molded and rigid composition of the preceding claim 1 which contains an added color-imparting quantity of mineral particles suspended by about 1½ percent weight to about 3 percent weight of micronized silica based on the weight of said copolymerization product.

6. A molded and rigid composition of the preceding claim 1 which additionally contains generally uniformly dispersed therein up to about 90 percent weight of finely divided high-density particles such as minerals which are thus suspended in situ within a solid matrix formed by said copolymerization.

7. A molded and rigid composition as defined in claim 1 characterized by added colorant compatible with and dispersed together with an epoxy polymerization catalyst in the copolymerization of said product.

8. A molded and rigid composition as defined in claim 3 which incorporates a catalytic amount of N-aminoethyl-piperazine.

9. A casting composition as defined in claim 1 containing colored mineral particles dispersed therein by about 1.5 percent weight to about 3 percent weight of micronized silica to impart to said composition the color and density of a naturally occurring stone.

10. A casting composition as defined in claim 8 which additionally contains aluminum silicate and leaded glass, dispersed therein in quantities adapted to impart to said composition the color and density of jade.

UNITED STATES PATENT OFFICE
CERTIFICATE OF CORRECTION

Patent No. 3,609,114              Dated September 28, 1971

Inventor(s) Elvin M. Bright

It is certified that error appears in the above-identified patent and that said Letters Patent are hereby corrected as shown below:

Column 1, line 28, "net" should read -- not -- . Column 2, line 5, delete "consummated". Column 3, line 37, the formula "$C_{12114}H_{22126}O_3$" should read -- $C_{12-14}H_{22-26}O_3$ -- ; line 50, "useable" should read -- usable -- ; line 55, "polymerization of" should read -- polymerization or -- . Column 4, line 4, "in a" should read -- in an -- . Column 5, line 61, "12g. 2-ethylhexyl acrylate-union Carbide" should read -- $\frac{12g}{100}$. 2-ethylhexyl acrylate-Union Carbide -- ; line 69, "5/8-inch" should read -- 1/8-inch -- . Column 8, lines 22 to 23, change "$C_{121-}H_{221=3}$" to read -- $C_{12-14}H_{22-26}O_3$ -- .

Signed and sealed this 10th day of October 1972.

(SEAL)
Attest:

EDWARD M. FLETCHER, JR.
Attesting Officer

ROBERT GOTTSCHALK
Commissioner of Patents